July 16, 1946.  F. WHITTLE  2,404,334
AIRCRAFT PROPULSION SYSTEM AND POWER UNIT
Filed Feb. 19, 1941  3 Sheets-Sheet 3
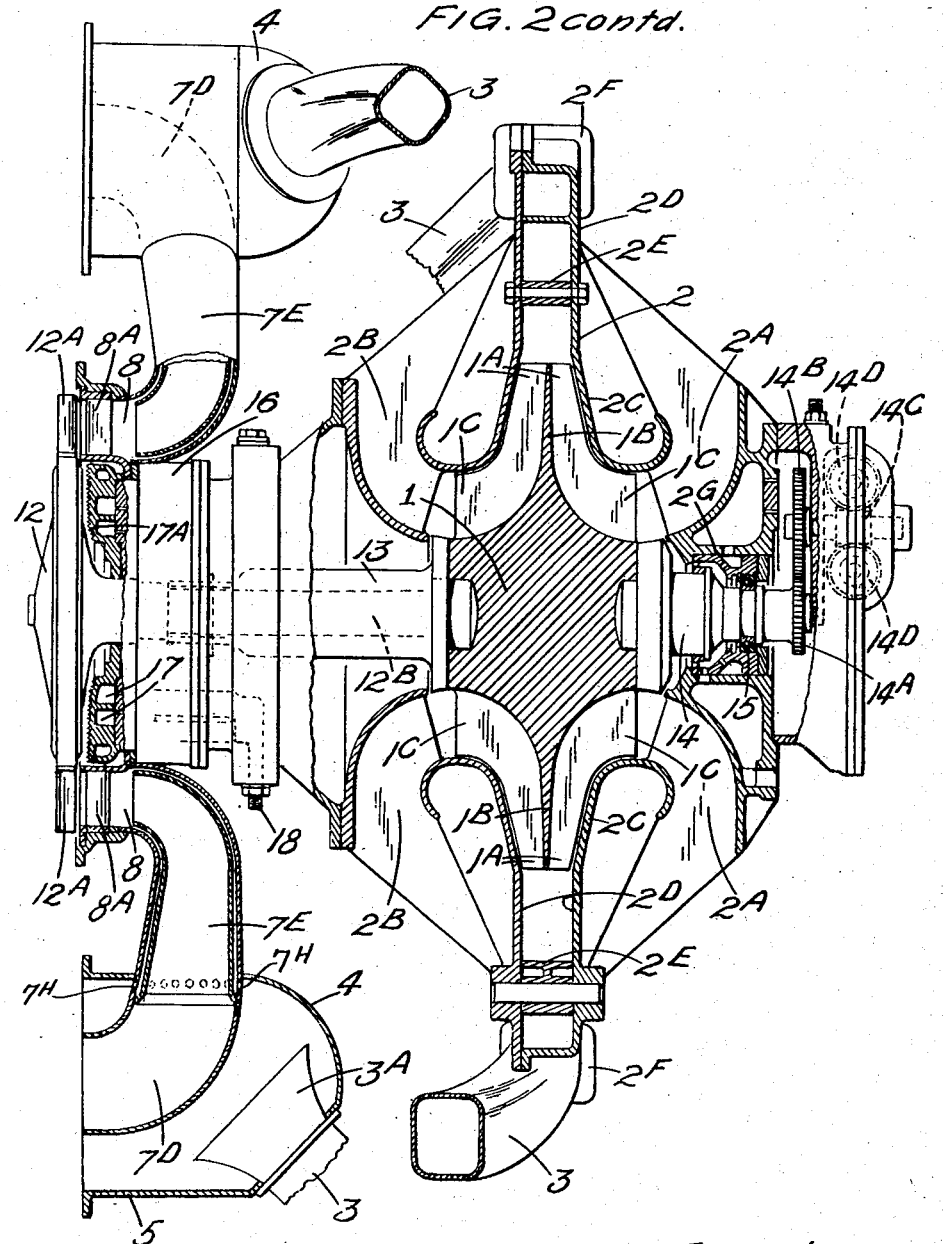
FIG. 2 contd.
Inventor.
Frank Whittle Patented July 16, 1946

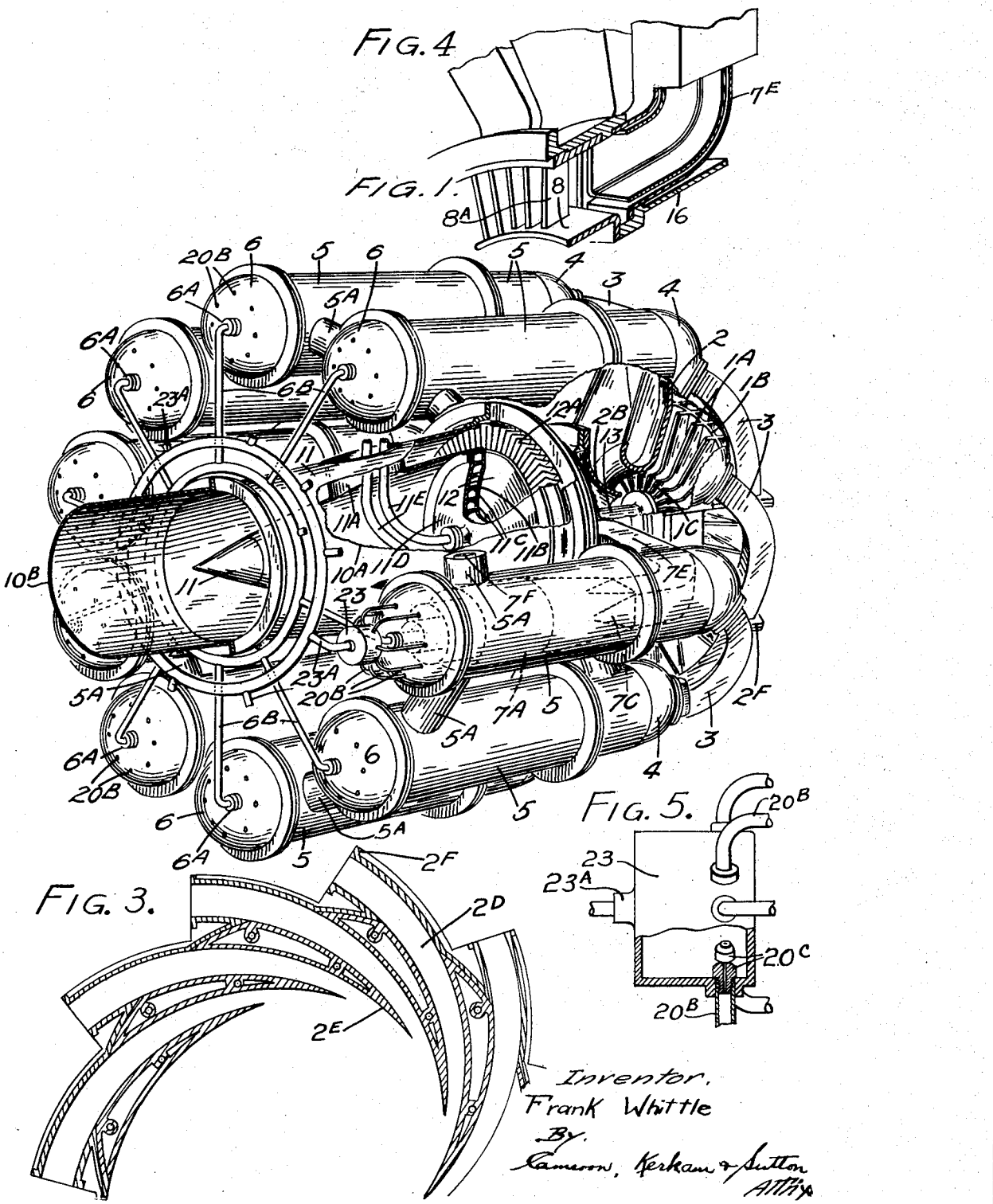

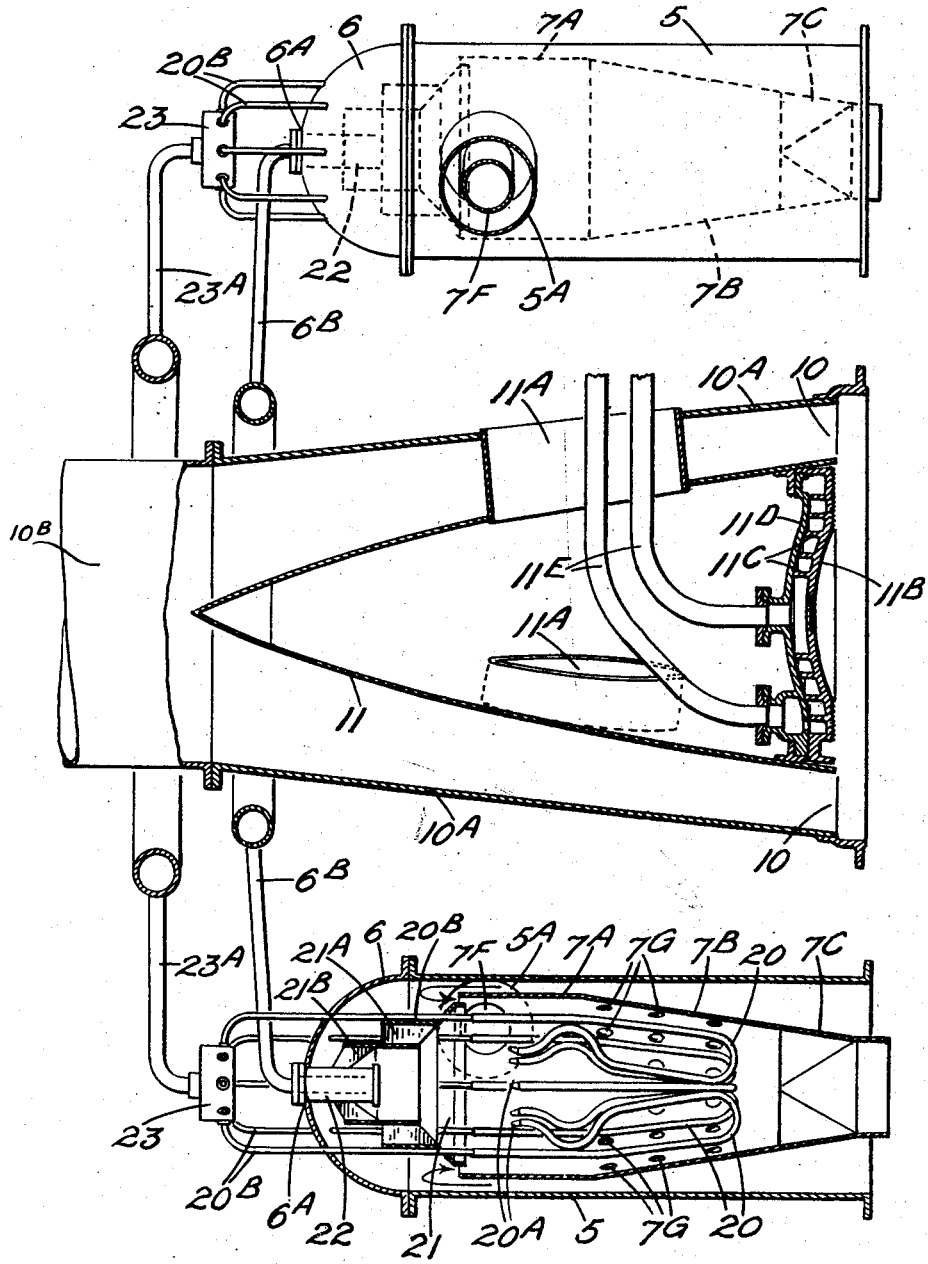

2,404,334

UNITED STATES PATENT OFFICE 2,404,334

AIRCRAFT PROPULSION SYSTEM AND POWER UNIT

Frank Whittle, Rugby, England, assignor to Power Jets (Research & Development) Limited, London, England Application February 19, 1941, Serial No. 379,734
In Great Britain December 9, 1939

15 Claims. (Cl. 60—35.6)

This invention relates to aircraft propulsion systems and power units. Whilst it is intended primarily to be applied to propulsion aircraft systems in which thrust is developed by reaction arising out of the expulsion of a stream of gas through a nozzle or jet, and this is deemed to be the application which uses the features of the invention most advantageously, yet it may be found that some or all of these features may also usefully be employed in power units for generating shaft power; or where it is required to produce a source of gas possessing considerable energy in the forms of velocity, pressure and heat, for example for driving turbines.

The kind of apparatus with which the invention is concerned, is in general that which comprises an air compressor, fuel-burning means in the compressor output, and a gas turbine driven by the combustion products and air heated thereby and mechanically driving the compressor.

Apparatus of this type is shown for example in my prior British Patent No. 347,206.

My present invention seeks to provide apparatus for a reaction propulsion system for aircraft, of the kind stated, having advantages of compactness and low weight for a given performance, which may be comparatively simple to produce, which is easy to install and which should require but little maintenance. A power unit made according to the invention, whether for the reaction propulsion of aircraft or for other purposes, has also advantages in relation to its efficiency as a prime mover, in that a highly efficient compressor is employed, bearings are few and may be simple and involve low loss, gas flows are well organised and efficiently conducted, heat is conserved, and temperature distribution is very uniform in the working parts.

The invention broadly stated, resides in an engine which comprises a centrifugal compressor with bilateral air intakes, and with a plurality of outlets arranged symmetrically about the rotor axis, which outlets lead to a like number of combustion chambers also disposed symmetrically in which fuel is burnt, the combustion chambers having ducts to the turbine nozzle ring affording continuous admission to that side of the turbine which is nearer the compressor, the turbine discharging through an axial duct around which the combustion chambers are disposed; and the compressor outlets comprise an openwork structure through which air reaches the compressor inlet which is between the compressor and turbine. The combustion chambers are preferably disposed wholly or mainly to the side of the turbine remote from the compressor, and the flow of air through them is reversed in directional sense.

The compressor outlets are arranged so that the air is at first allowed to flow tangentially, bends (which may have guide vanes or cascades) then directing the flow in the axial direction into the combustion chambers. Means are preferably provided to ensure substantially equal delivery of fuel into the flame tubes of the combustion chambers, as well as substantially equal quantities of air into the chambers, so that the admission to the turbine will be at a uniform temperature all around. Whilst it may not be possible to ensure uniform heat distribution (it is found to be difficult in practice) it should at any rate be such that gases reaching the tips of the turbine blades should not be at a less temperature than that reaching the roots, and substantially uniform temperature distribution peripherally is aimed at. The combustion chambers are preferably either cylindrical or slightly conical, and are domed at their ends to afford strength against internal pressure, whilst the flame tubes are substantially coaxially arranged within them, and are each adapted to receive the whole air put through their respective chambers in such a way as to ensure as complete combustion as possible, and to admit "secondary" air, i. e. that proportion of the total air which is not required for combustion, in such a way that it is thoroughly mixed with the combustion gases and the temperature of the whole is then as above stated.

The combustion chambers are preferably interconnected by short stub pipes, situated near their domed ends to balance their internal pressures. The flame tubes may also be interconnected by ducts housed within the stub pipes, to make it possible to ignite the gases in some of them from one or others, in which ignition may be started for example by a sparking plug. Alternatively, the ducts may be dispensed with, and a sparking plug provided for each flame tube.

An engine for the propulsion of an aircraft, according to the invention, is illustrated by the accompanying drawings, of which Figure 1 is an external perspective view with sufficient broken away for the identification of some internal parts, and Figure 2 is a sectional side elevation. Figure 3 shows an arrangement of diffuser vanes, Figure 4 is a detail view of part of the turbine structure, and Figure 5 is a detail view of part of the fuel feeding means.

The engine comprises, broadly, a compressor, a combustion system, a turbine, and a jet pipe for the turbine exhaust, the combustion system preferably comprising a plurality of interconnected units of the construction specifically disclosed and claimed in my co-pending application Serial No. 379,735, filed February 19, 1941.

The compressor is a centrifugal compressor with impeller 1 running in a casing 2, and bilateral air intakes. The casing has intake eyes 2A, 2B, at front and rear, a radially convergent part 2C, a parallel-walled primary diffuser part 2D, which at the periphery has tangential outlets 10 each one of which is prolonged by an air trunk 3. The impeller 1 has radial vanes 1A on each side of an annular web 1B, the inner parts of the vanes 1A being extended axially and bent at 1C forming intake vanes to direct the inflowing air, in the eyes 2A, 2B. The vanes 1A sweep the convergent part of the casing, 2C. Between the walls of the part 2D of the casing, streamlined fixed diffuser vanes 2E are mounted (Fig. 3), and these control the path of the air and also stiffen the structure. The outlets present rectangular flanges 2F to which are bolted the trunks 3.

The trunks 3 are curved out of the plane of the compressor, and form divergent ducts further diffusing the delivered air. Their curvature brings them to the end caps 4 of combustion chambers, into which they lead with radial and axial components of direction. Within the caps 4, the trunks have bell mouths 3A.

The combustion chambers comprise the end caps 4, on the forward ends of cylindrical air casings 5, at the rear ends of which are domes 6. These parts are formed of sheet metal and are quite light, being designed to withstand such internal pressure as may be generated by the compressor and diffuser system. The axes of the chambers are parallel with that of the impeller 1 and they are disposed symmetrically and equidistantly around that axis, in a generally circular form, (as seen in Figure 1). It will be observed that the trunks 3, extending from the casing 2 to the combustion chambers, constitute an open-work structure, surrounding the rear intake eye 2B of the compressor. The necessary freedom of access of air to the rear eye of the impeller is therefore afforded.

Within each combustion chamber is a flame tube. This may have various forms in detail, the example shown being partly cylindrical at 7A, continuing as a frusto-conical part 7B, and finally changing section from circular to square at a neck 7C. The flame tubes receive air at their rear ends, fuel is burnt in them, and the combustion products proceed through the tubes, around elbows at 7D, through ducts 7E, to the turbine nozzle ring at 8. The ducts 7E are preferably double walled and the inter-wall space may carry cool air from the chambers into the turbine, the cooling air entering the inter-wall spaces through the ports 7H and thereby reducing heat losses from the ducts. The nozzle ring has fixed nozzle blades 8A, the arrangement of the ducts 7E, nozzle ring 8 and blades 8A being shown more clearly in Figure 4. Thus the ducts 7E each provide for admission of gases to a circumferential section of the nozzle ring 8, the circumferential length of these sections depending on the circumferential extent of the duct ends. With an appropriate relationship between the size of the duct ends and the number of ducts, the admission of gases may be made substantially continuous throughout the entire periphery of the ring.

Passing between the nozzle blades 8A and across an axial clearance, the gases then impinge on the blades 12A of the turbine, which is a single stage axial flow turbine, drive the turbine and are emitted therefrom through an annular passage 10. The passage 10 is formed by a frusto-conical wall 10A, coaxial with the turbine, and within which is a streamlined fairing 11 supported by (say) three streamlined hollow struts 11A. The flow from the passage 10 is conveyed through a jet pipe 10B, to the atmosphere. The fairing 11 has its forward end formed by a water cooled circular wall 11B to receive heat from the turbine wheel disc 12 and enable it to be conveyed away. The water for this is circulated through suitable passages formed by ribs 11C and a rear wall 11D, by water pipes 11E which are led through one of the struts 11A.

The turbine wheel, comprising the disc 12 and blades 12A, is mounted as an overhung wheel, integral with a shaft 12B which is fitted with splines into a hollow shaft called a quill shaft, 13, which is in turn secured to the impeller 1. On its other (forward) side, the impeller has a stub shaft 14 similarly attached to it, and this shaft drives such auxiliary mechanism as may be necessary, through appropriate trains such as pinions 14A, 14B, worm 14C, worm-wheels 14D. It may be mentioned that the turbine and impeller are aligned and interattached with the greatest care and the complete rotor assembly so formed, thoroughly balanced.

The rotor assembly is borne by two main bearings; the forward bearing is shown at 15 housed within an extension 2G of the structure of the compressor casing 2, and this bearing is adapted to take such axial loads as may arise, as well as journal loads. The rear bearing is housed within a rearward extension casing 16 of the compressor casing structure, which extension (as well as being the bearing housing) comprises an annular water jacket 17 with a rear wall 17A facing the turbine disc 12, through which jacket water is circulated similarly to that at the rear of the turbine. Bearing lubrication and cooling is preferably by force feed of air and oil provided in any suitable and convenient manner.

Returning now to the combustion arrangements it will be seen that the flame tube 7A, 7B, 7C, contains a set of vaporiser tubes 20, which are symmetrically disposed about the flame tube axis, and which terminate in jets 20A directed upstream in the air flow, so that the greater part of the tubes 20 are directly in flame. The reversal of direction of the combustion or "primary" air is indicated by arrows. The vaporiser tubes 20 are supplied by a like number of pipes 20B which extend through the dome end 6. They pass through a partial closure baffle 21 located in the otherwise open end of the flame tube part 7A. This baffle 21 has swirler vanes, for example an outer ring of vanes 21A and an inner ring 21B, which may be pitched in opposite rotational sense, to produce a high degree of swirl and local turbulence in the combustion gases. Axially through the dome 6, and within the inner vanes 21B is provided a tubular bush 22 to receive and mount a pilot jet (located at 6A) for starting purposes. There are various standard commercial atomising spray jets which may be used for this purpose, so none will be detailed.

Each combustion chamber 5 is connected to its neighbours by stub pipes 5A by which their internal pressures are balanced. Within each stub pipe 5A is a lesser pipe 7F interconnecting neighbouring flame tubes. The purpose of these ducts is to enable lighting up to be effected simply by initially procuring ignition in one flame tube, e. g.

by a sparking plug, whereafter the others light up because burning gases pass along the ducts. It appears that this action is due to the fact that, upon ignition in one tube, there is a considerable rise of pressure therein as compared with its neighbours, and therefore a flow of ignited gas to the neighbours.

The stub pipes and ducts may be dispensed with and other means adopted for lighting up, for example, the provision of a sparking plug in each flame tube.

The liquid fuel is supplied by pump, through a suitable throttle valve, and through such filters, etc. as may be required. It flows into a box 23 associated with each combustion chamber, by a manifold pipe 23A, and emerges from the box 23 by the pipes 20B. The fuel flowing from the box 23 to the pipes 20B may be caused to pass through suitable restriction orifices such as the nipples 20C (see Fig. 5), which act as weirs and prevent surging as between the vaporizer elements 20.

By this means, it is provided that the distribution of fuel is as uniform and symmetrical as possible, both around the engine as a whole, and also within each flame tube. Axially directed pilot jets of spray atomising type are also provided in the centres of the domes 6, as at 6A, and these are supplied by a fuel manifold system 6B.

The flame tubes are preferably perforated with air holes such as 7G by which secondary air flows into them, for mixture with the combustion gases. The larger proportion of the total air is regarded as secondary air, in a practical design where reasonably low turbine temperatures are to be involved. It has been found impossible to lay down the exact details of the primary and secondary air passages, as the aerodynamic, thermodynamic, and thermochemical effects are evidently very complex.

The object to be sought is, that the temperatures readable at a number of locations or stations across the outlet of a flame tube to the nozzle ring, should be as uniform as possible, and if there is inequality it should be in the sense that the temperature is higher in the gases flowing to the tips of the blades 12A, than to the roots and that the mean temperature from the individual flame tubes is as uniform as possible around the engine. This result may be achieved by choosing and if necessary altering the size, location, and number, of the holes 7G by matching the flows through the vaporiser elements 20 as nearly as possible and by equalising the flows through the pipes 23A.

It will be appreciated that the engine as a whole is practically a symmetrical arrangement about the rotor axis.

What I claim is:

1. An engine of the character described comprising a centrifugal compressor having intake eyes symmetrically disposed on opposite sides of its plane of rotation and a plurality of outlets symmetrically disposed in circular disposition about its axis of rotation, a corresponding and similarly disposed plurality of air ducts leading from said outlets towards one side of said plane, an axial flow turbine arranged coaxial with said compressor on the same side thereof as that of said ducts and adapted to directly mechanically drive the compressor, a plurality of combustion chambers arranged in circular disposition around said axis, an air duct connecting each of said outlets to one of said chambers, means for introducing fuel into each of said chambers for continuous combustion therein, a combustion product duct leading from each of said chambers to said turbine on the side thereof to which said compressor is located, the construction formed by said air ducts, combustion chambers and combustion product ducts constituting a skeleton structure leaving open acess through which air is permitted to enter the compressor intake eye situated nearer the turbine, and an exhaust conduit leading axially away from the side of the turbine opposite to the side to which said combustion products are admitted.

2. An engine according to claim 1 wherein said combustion chambers are peripherally spaced from each other and are radially spaced from the outside of said exhaust conduit.

3. An engine of the character described, comprising a centrifugal compressor having a casing, a pair of air intakes symmetrically arranged on opposite sides of its plane of rotation and a plurality of discharge outlets symmetrically disposed about and extending tangentially to the periphery of said casing, a corresponding plurality of combustion chambers symmetrically disposed with respect to the axis of rotation of said compressor, each of said chambers having an outer circular-sectioned casing and a flame tube enclosed therewithin, conduits connecting the compressor discharge outlets with the outer casings of said combustion chambers for delivering compressed air thereto, means for supplying fuel to said flame tubes, means for supplying compressed air from the interior of said combustion chamber casing to said flame tube, a turbine coaxial with said compressor and having a continuous annular nozzle chamber and an axially extending exhaust conduit, ducts symmetrically disposed with respect to the common axis of said compressor and turbine for delivering the products of combustion from said flame tubes to said turbine nozzle chamber, said combustion chambers being so constructed and arranged that the general direction of flow therethrough of the air and products of combustion is substantially parallel to said common axis, pressure equalising air conduits interconnecting the outer casings of the combustion chambers at points remote from the air delivery conduits, and gas conduits housed within said pressure equalising air conduits interconnecting the flame tubes, whereby the gases in one flame tube may be ignited by the combustion in another.

4. An engine of the character described, comprising a centrifugal compressor having a casing, a pair of air intakes symmetrically arranged on opposite sides of its plane of rotation and a plurality of discharge outlets symmetrically disposed about and extending tangentially to the periphery of said casing, a corresponding plurality of combustion chambers symmetrically disposed with respect to the axis of rotation of said compressor, each of said chambers having an outer circular-sectioned casing and a flame tube enclosed therewithin, conduits connecting the compressor discharge outlets with the outer casings of said combustion chambers for delivering compressed air thereto, means for supplying fuel to said flame tubes, means for supplying compressed air from the interior of said combustion chamber casing to said flame tube, a turbine coaxial with said compressor and having a continuous annular nozzle chamber and an axially extending exhaust conduit, ducts symmetrically disposed with respect to the common axis of said compressor and turbine for delivering the products of combustion from said flame tubes to said turbine nozzle chamber, said combustion chambers being so constructed and arranged that the general direction of flow therethrough of the air and products of combustion is substantially parallel to said common axis, pressure equalising air conduits interconnecting the outer casings of the combustion chambers, gas conduits housed within said air conduits interconnecting the flame tubes, and ignition means associated with at least one of said flame tubes, said interconnecting gas conduits enabling ignition of the gases in those flame tubes not provided with ignition means by a flow of ignited gas from a flame tube wherein ignition has already been effected.

5. A continuous combustion gas turbine engine adapted for the jet propulsion of air craft comprising a centrifugal compressor and an axial flow turbine, said compressor having an impeller connected with said turbine for rotation therewith on a common axis and said impeller and turbine having substantially the same diameter, a casing for said compressor having a plurality of peripheral outlets, diffusion means in said casing surrounding said impeller and substantially increasing the diameter of said casing whereby the mean radius of outlet from said compressor is substantially greater than the mean radius of admission to said turbine, a plurality of combustion chambers spaced circumferentially around said common axis and each having combustion means therein, means connecting each of said chambers with one of said outlets and also with said turbine, said means and chambers conducting air and gases from said compressor to said turbine in a path which is generally axial but which comprises inward convergence, and an exhaust conduit extending axially away from said turbine on the side opposite the compressor.

6. An engine as defined in claim 5, having means interconnecting said combustion chambers to balance the pressure therein.

7. An engine as defined in claim 5, comprising flame tubes within the combustion chambers, and means interconnecting said chambers to balance the pressure therein including means interconnecting the interiors of said flame tubes.

8. An engine as defined in claim 5, said chambers being substantially cylindrical and forming a symmetrical group surrounding said common axis with the axis of each chamber in a common plane with said common axis.

9. An engine as defined in claim 5, said chambers being substantially cylindrical and forming a symmetrical group surrounding said common axis with the axis of each chamber in a common plane with said common axis, and a flame tube supported coaxially in each chamber, said flame tubes being of circular cross section and symmetrical about the chamber axes throughout their lengths.

10. An engine as defined in claim 5, said exhaust conduit being annular and continuous adjacent the turbine and leading to a propulsion exhaust jet.

11. An engine as defined in claim 5, said compressor having bilateral intakes.

12. An engine as defined in claim 5, said compressor having bilateral intakes one of which is located on the side next the turbine, said connecting means being spaced to provide access of air to said one intake.

13. An engine as defined in claim 5, said chambers extending axially beyond the turbine and comprising means for reversing the direction of axial flow of the air leaving the compressor and discharging air and gases axially toward the compressor, said connection from the chambers to the turbine converging inwardly and again reversing the direction of axial flow to admit said air and gases to that side of the turbine which is adjacent the compressor.

14. An engine according to claim 5 including common bearing means for supporting the turbine and compressor rotors located on the one hand between the two rotors and on the other hand on the side of the compressor remote from the turbine.

15. An engine according to claim 5 wherein the exhaust conduit is annular where it leaves the turbine and merges into cylindrical form at a distance more remote from the turbine.

FRANK WHITTLE.